(12) United States Patent
Ishigami et al.

(10) Patent No.: US 9,542,606 B2
(45) Date of Patent: Jan. 10, 2017

(54) LANE LINE RECOGNITION APPARATUS

(71) Applicant: DENSO CORPORATION, Kariya, Aichi-pref. (JP)

(72) Inventors: Hirotake Ishigami, Susono (JP); Naoki Kawasaki, Kariya (JP); Syunya Kumano, Gothenburg (SE); Shunsuke Suzuki, Aichi-ken (JP); Satoshi Osanai, Obu (JP); Tetsuya Takafuji, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 144 days.

(21) Appl. No.: 14/635,540

(22) Filed: Mar. 2, 2015

(65) Prior Publication Data
US 2015/0248588 A1    Sep. 3, 2015

(30) Foreign Application Priority Data

Mar. 3, 2014    (JP) .................................. 2014-040302

(51) Int. Cl.
G06K 9/00    (2006.01)
G06T 7/00    (2006.01)
G06T 7/60    (2006.01)

(52) U.S. Cl.
CPC ......... G06K 9/00798 (2013.01); G06T 7/0085 (2013.01); G06T 7/60 (2013.01); G06T 2207/20061 (2013.01); G06T 2207/30256 (2013.01)

(58) Field of Classification Search
CPC ..... G06K 9/00798; G06T 7/60; G06T 7/0085; G06T 2207/30256; G06T 2207/20061
See application file for complete search history.

(56) References Cited

U.S. PATENT DOCUMENTS 6,577,334 B1    6/2003    Kawai et al.
2008/0114532 A1    5/2008    Nishida et al.
(Continued)

FOREIGN PATENT DOCUMENTS

JP    2000-105898    4/2000
JP    2003-065715    3/2003
(Continued)

*Primary Examiner* — Bhavesh Mehta
*Assistant Examiner* — Menatoallah Youssef
(74) *Attorney, Agent, or Firm* — Harness, Dickey & Pierce, P.L.C.

(57) ABSTRACT

In a lane line recognition apparatus, an abnormality determiner is configured to determine whether or not a width of a travel lane defined by left-side and right-side lane lines is abnormal, and a lane-line recognizer is configured to, when the width of the travel lane is not abnormal, recognize both of the left-side and right-side lane lines in a both-side line recognition mode, and when the width of the travel lane is abnormal, recognize one of the lane lines in a one-side line recognition mode. In the one-side line recognition mode, the lane-line recognizer is configured to, for each of the left-side and right-side lane lines, calculate two or more parameters of the lane line, and then integrate recognition results for the respective two or more parameters, and based on the integrated recognition results of the left-side and right-side lane lines, select one of the lane lines to be recognized.

9 Claims, 3 Drawing Sheets

(56) References Cited

U.S. PATENT DOCUMENTS

2008/0189012 A1* 8/2008 Kaufmann ........... B62D 15/029
  701/41
2011/0010021 A1 1/2011 Kobayashi

FOREIGN PATENT DOCUMENTS

| JP | 2008-123348 | 5/2008 |
| JP | 2009-143309 | 7/2009 |
| JP | 2011-198276 | 10/2011 |
| JP | 5124875 | 11/2012 |

* cited by examiner

FIG.2
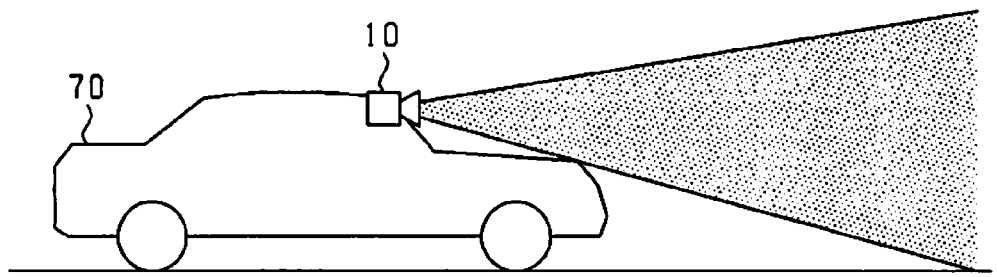
FIG.3A
FIG.3B
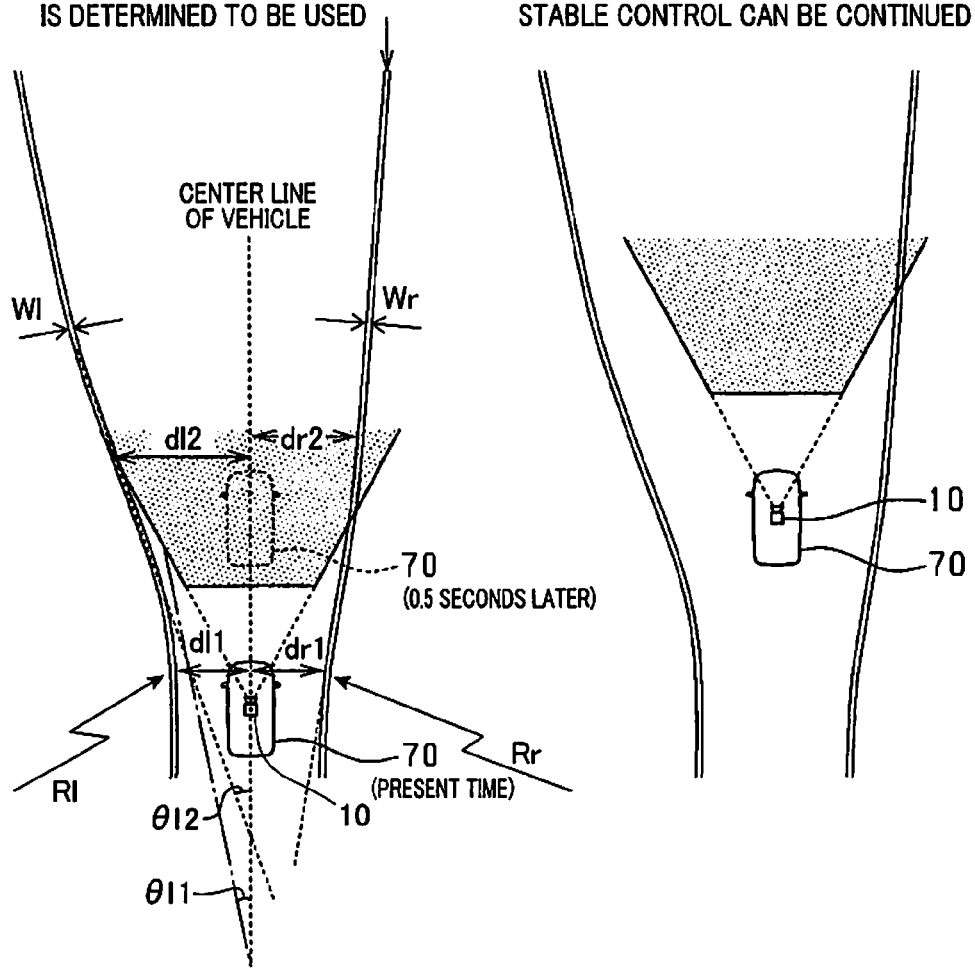

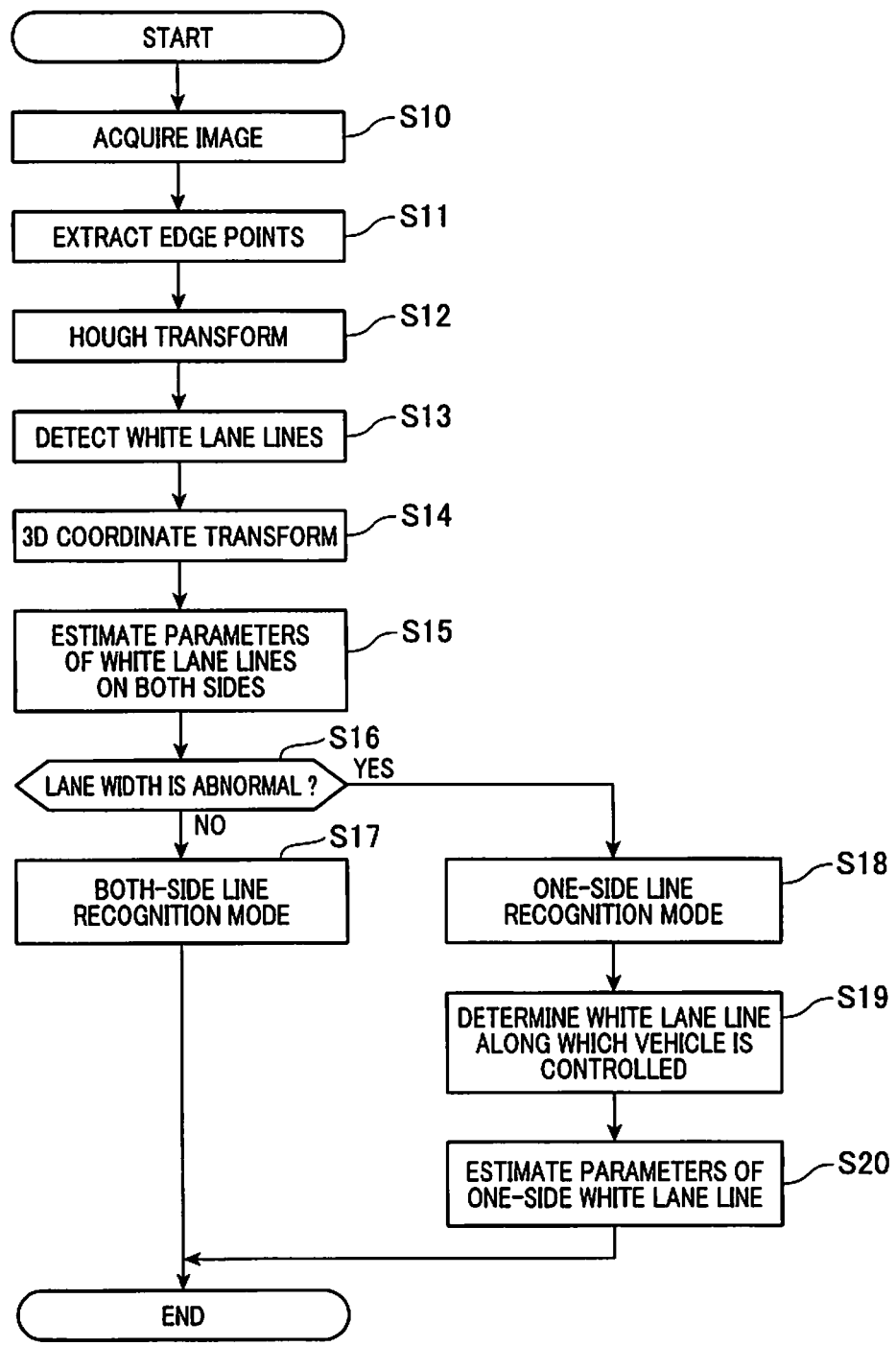

LANE LINE RECOGNITION APPARATUS

CROSS-REFERENCE TO RELATED APPLICATION

This application is based on and claims the benefit of priority from earlier Japanese Patent Applications No. 2014-40302 filed Mar. 3, 2014, the descriptions of which are incorporated herein by reference.

TECHNICAL FIELD

The present invention relates to a lane line recognition apparatus for recognizing lane lines on a roadway based on images captured by a vehicle-mounted camera.

RELATED ART

There have been proposed a technique for recognizing left and right lane lines on a roadway based on camera-captured images and controlling a vehicle steering system and the like so that a controlled vehicle (hereinafter referred to as a subject vehicle) can travel along the left and right lane lines, and a technique for notifying when the subject vehicle leaves the travel lane. However, at or around a turnoff where one of the left and right lane lines of the travel lane is connected to one of left and right lane lines of another lane, a cross-lane direction distance between the left and right lane lines increases. Therefore, at or around such a turnoff, it is inappropriate to recognize both the left and right lane lines along which the subject vehicle is controlled.

In a technique disclosed in Japanese Patent No. 5,124,875, in a case where a cross-lane direction distance between left and right lane markings (as lane lines) gradually increases and a travel area defined by the left and right lane markings widens to an undue degree, one of the left and right lane markings that extends in a direction to be traveled is defined as a reference lane marking. Driving assistance is conducted lest the vehicle leave an area defined by the reference lane line and a virtual lane line that is spaced apart from the reference lane line by an average lane width.

The technique disclosed in Japanese Patent No. 5,124,875 is configured to recognize or identify a traveling-scheduled road based on routes recommended by a navigation device, and a vehicle speed and a yaw rate detected by sensors, and select the reference lane line based only on the traveling-scheduled road. However, since there are various disturbance factors on an actual roadway, the reference lane larking may not be determined readily from the traveling-scheduled road alone. Selecting the reference lane line based only on the traveling-scheduled road may diminish the accuracy of selecting the reference lane line.

In consideration of the foregoing, it would therefore be desirable to have a lane line recognition apparatus capable of increasing the accuracy of selecting one of left-side and right-side lane lines when a vehicle is forced to be controlled along only one of left-side and right-side lane lines.

SUMMARY

In accordance with an exemplary embodiment of the present invention, there is provided a lane line recognition apparatus including: an imaging unit mounted in a vehicle and configured to capture an image of a travel lane; a lane-line detector configured to detect left-side and right-side lane lines that define the travel lane based on the image captured by the vehicle-mounted camera; an abnormality determiner configured to determine whether or not a width of the travel lane defined by the left-side and right-side lane lines detected by the lane-line detector is abnormal; a lane-line recognizer configured to, when it is determined by the abnormality determiner that the width of the travel lane is not abnormal, recognize both of the left-side and right-side lane lines in a both-side line recognition mode, or when it is determined by the abnormality determiner that the width of the travel lane is abnormal, recognize one of the left-side and right-side lane lines in a one-side line recognition mode. In the one-side line recognition mode, the lane-line recognizer is configured to, for each of the left-side and right-side lane lines detected by the lane-line detector, calculate two or more parameters, of parameters representing positions of the vehicle in the travel lane relative to the lane line and parameters representing a shape of the lane line, then integrate recognition results for the respective two or more parameters, and based on the integrated recognition results of the left-side and right-side lane lines, select one of the left-side and right-side lane lines to be recognized.

With the lane line recognition apparatus configured as above, the left-side and right-side lane lines that define the travel lane are detected based on the image captured by the vehicle-mounted camera, and based on the detected left-side and right-side lane lines, it is determined whether or not the width of the travel lane defined by the left-side and right-side lane lines detected is abnormal. When it is determined that the width of the travel lane is abnormal, one of the left-side and right-side lane lines is recognized in the one-side line recognition mode.

For each of the detected left-side and right-side lane lines, two or more parameters, of parameters representing positions of the vehicle in the travel lane relative to the lane line and parameters representing a shape of the lane line are calculated, and then recognition results for the respective two or more parameters are integrated. Further, based on the integrated recognition results of the left-side and right-side lane lines, one of the left-side and right-side lane lines to be recognized is selected. With this configuration, when the subject vehicle is forced to be controlled along only one of left-side and right-side lane lines, the one of the left-side and right-side lane lines is selected based on the recognition results of the white lane lines for the plurality of parameters, which can increase the accuracy of selecting one of the left-side and right-side lane lines that is to be recognized. Thus, even in a situation that the travel lane widens in front of a superhighway tollbooth or the like, one of the left-side and right-side lane lines can be accurately selected, which allows stable driving assistance to be continued based on the recognized white lane line on one of the left and right sides of the subject vehicle.

In accordance with another exemplary embodiment of the present invention, there is provided a lane line recognition apparatus including: an imaging unit mounted in a vehicle and configured to capture an image of a travel lane; a lane-line detector configured to detect left-side and right-side lane lines that define the travel lane based on the image captured by the vehicle-mounted camera; a lane-line recognizer configured to recognize both of the left-side and right-side lane lines detected by the lane-line detector in a both-side line recognition mode or one of the left-side and right-side lane lines in a one-side line recognition mode; and an annunciator configured to, when the lane-line recognizer is in the one-side line recognition mode, inform a driver of the vehicle of the lane-line recognizer being in the one-side recognition mode.

With the lane line recognition apparatus configured as above, the left-side and right-side lane lines that define the travel lane are detected based on the image captured by the vehicle-mounted camera. Both of the left-side and right-side lane lines may be recognized in the both-side line recognition mode, or one of the left-side and right-side lane lines may be recognized in the one-side line recognition mode. Thus, with use of the one-side line recognition mode, even in a situation that the travel lane widens ahead of the vehicle, stable driving assistance is allowed to be continued by recognizing one of the left-side and right-side white lane lines. Further, in the one-side line recognition mode, the driver of the vehicle is informed of the lane-line recognizer being in the one-side recognition mode. Therefore, the driver of the vehicle can know that the lane line is recognized in the one-side line recognition mode that less comfortable than the both-side recognition mode, and the driver is allowed to determine whether to continue or suspend the driving assistance.

BRIEF DESCRIPTION OF THE DRAWINGS

FIG. 2 is a mounting position of a vehicle-mounted camera;

FIGS. 3A and 3B show a scenario where in a one-side line recognition mode only a right-side white lane line is recognized to control a vehicle; and FIG. 4 is a flowchart of a white lane line recognition process.

DESCRIPTION OF SPECIFIC EMBODIMENTS

Figure 1:
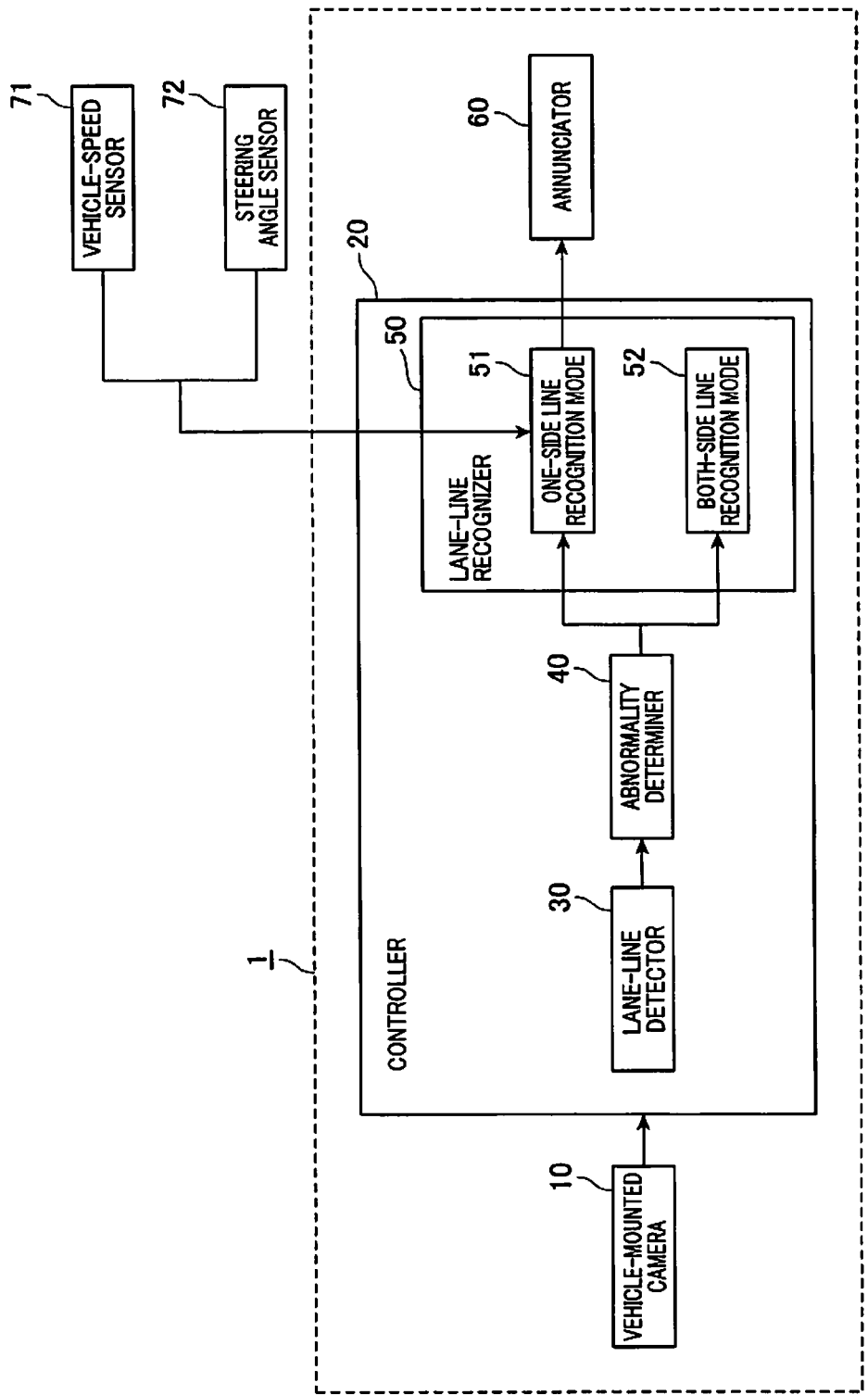
FIG. 1 is a block diagram of a white lane line recognition apparatus in accordance with one embodiment of the present invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A white-line recognition apparatus (as a lane line recognition apparatus) in accordance with one embodiment of the present embodiment will now be explained in detail with reference to the accompanying drawings, where a lane line or lines recognized by the white-line recognition apparatus may be used in the lane-keeping (or lane-tracking) assist control (LKA control).

A white-line recognition apparatus of the present embodiment will now be explained with reference to FIG. 1. The white-line recognition apparatus 1 includes a vehicle-mounted camera 10 (as an imaging unit), a controller 20, and an annunciator 60, and is configured to be able to receive detection values from a vehicle-speed sensor 71 and a steering angle sensor 72.

The vehicle-mounted camera 10 includes, but is not limited to, a charge-coupled device (CCD) camera, a complementary metal-oxide semiconductor (CMOS) image sensor, or a near-infrared camera. As shown in FIG. 2, the vehicle-mounted camera 10 is configured to capture an image of a travel lane in front of the vehicle 70. More specifically, the vehicle-mounted camera 10 is attached to a widthwise direction center of the vehicle 70, for example, to a rear view mirror of the vehicle 70, so as to capture an image of an area that spans a pre-defined angular range horizontally with respect to a traveling direction (see hatched areas in FIGS. 3A, 3B).

The controller 20 includes a computer including Central Processing Unit (CPU), Read Only Memory (ROM), Random Access Memory (RAM), Input/Output (I/O) interface and others. A lane-line detector 30, an abnormality determiner 40, a lane-line recognizer 50 (which are described later) may be realized by the CPU executing various programs stored in the RAM or the like.

The lane-line detector 30 is configured to detect left-side and right-side white lane lines (as lane lines) that define the travel lane based on the image (or images) captured by the vehicle-mounted camera 10. More specifically, the lane-line detector 30 is configured to extract edge points based on luminance information of image data, Hough-transform the extracted edge points to calculate straight lines representing left and right outlines of left-side and right-side white lane lines, and detect one of the left-side white lane line or lines defined by the calculated left and right outlines and one of the right-side white lane line or lines defined by the calculated left and right outlines.

The abnormality determiner 40 is configured to determine whether or not a width of the travel lane defined by the left-side and right-side white lane lines detected by the lane-line detector 30 is abnormal. More specifically, as shown in FIG. 3A, it is determined whether or not a cross-lane direction distance or spacing between the left-side and right-side white lane lines detected by the lane-line detector 30 ahead of the subject vehicle 70 is greater than a threshold. Such scenarios that the cross-lane direction distance increases to above the threshold ahead of the subject vehicle 70 include the travel lane diverging in front of a superhighway tollbooth or ahead of the subject vehicle 70 with the left-side and right-side white lane lines detected by the lane-line detector 30 respectively extending along different diverging travel lanes.

The lane-line recognizer 50 is configured to recognize the white lane line or lines, along which the subject vehicle is controlled, either in a both-side line recognition mode 52 or in a one-side line recognition mode 51. More specifically, the lane-line recognizer 50 is configured to normally recognize the left-side and right-side white lane lines in the both-side line recognition mode 52, and when it is determined by the abnormality determiner 40 that the cross-lane direction distance between the left-side and right-side white lane lines detected by the lane-line detector 30 ahead of the subject vehicle 70 is greater than the threshold, recognize the left-side or right-side white lane line in the one-side line recognition mode 51. It should be noted that in the present embodiment "recognizing" means "calculating, estimating, or evaluating" that is necessary for information processing described later.

In the both-side line recognition mode 52, the lane-line recognizer 50 recognizes the left-side and right-side white lane lines detected by the lane-line detector 30 as white lane lines on both a left hand side and a right hand side of the subject vehicle along which the LKA control is conducted. That is, in the both-side line recognition mode 52, parameters used in the LKA control are estimated from the left-side and right-side white lane lines detected by the lane-line detector 30. In the one-side line recognition mode 51, the lane-line recognizer 50 recognizes one of the left-side and right-side white lane lines detected by the lane-line detector 30 as a white lane line on a left hand side or a right hand side of the subject vehicle along which the LKA control is conducted. That is, in the one-side line recognition mode 51, parameters used in the LKA control are estimated from the one of the left-side and right-side white lane lines detected by the lane-line detector 30.

In the one-side line recognition mode 51, for each of the left-side and right-side white lane lines detected by the lane-line detector 30, two or more parameters are calculated, of a parameter representing a position of the subject vehicle 70 in the travel lane relative to the detected white lane line and parameters representing a shape of the detected white lane line. Further, in the one-side line recognition mode 51, recognition results of each of the left-side and right-side white lane lines detected by the lane-line detector 30 for the calculated two or more parameters are integrated to select one of the left-side and right-side white lane lines detected by the lane-line detector 30.

More specifically, in the one-side line recognition mode 51, each of the left-side and right-side white lane lines detected by the lane-line detector 30 is evaluated based on each of the calculated parameters of the detected white lane line to calculate a priority to select the detected white for the calculated parameter. Further, in the one-side line recognition mode 51, for each of the left-side and right-side white lane lines detected by the lane-line detector 30, the priorities to select the detected white lane line for the respective parameters are integrated. Based on the integrated priorities, a higher priority one of the left-side and right-side white lane lines detected by the lane-line detector 30 is selected.

The annunciator 60 is configured to inform a driver of the subject vehicle 70 of a recognition mode of the lane-line recognizer 50 switching between the both-side line recognition mode 52 and the one-side line recognition mode 51. More specifically, the annunciator 60 may include a visual display, such as a display or a lamp, a speaker that outputs audio sounds, a vibrator that outputs vibrations, for indicating that the recognition mode of the lane-line recognizer 50 switched between the one-side line recognition mode 51 and the both-side line recognition mode 52. Alternatively, the annunciator 60 may include a visual display or a speaker that outputs audio sounds for indicating that the lane-line recognizer 50 is in the both-side line recognition mode 52 or in the one-side line recognition mode 51.

A process for recognizing white lane lines (hereinafter also referred to as a white lane line recognition process) will now be explained with reference to a flowchart of FIG. 4. This process may be performed by the controller 20 every time the vehicle-mounted camera 10 captures an image.

In step S10, the lane-line detector 30 acquires an image captured by the vehicle-mounted camera 10. The lane-line detector 30 applies a sobel-x filter to the captured image to extract edge points where the luminance rises in a horizontal direction from the left side of the captured image to the right-side and edge points where the luminance rises in a horizontal direction from the right-side of the captured image to the left side. This allows the edge points on both the left and right sides of each white lane line to be extracted from the captured image.

Subsequently, in step S12, the edge points extracted in step S11 are Hough-transformed to calculate straight lines each passing through some of the extracted edge points. This allows the straight lines representing left side and right-side outlines of respective white lane line candidates to be calculated. In step S13, the lane-line detector 30 detects one of the left-side white lane line candidates outlined by the straight lines calculated in step S12 having a maximum likelihood as a white lane line on the left side of the subject vehicle (hereinafter referred to as a left-side white lane line) and one of the right-side white lane line candidates outlined by the straight lines calculated in step S12 having a maximum likelihood as a white lane line on the right-side of the subject vehicle (hereinafter referred to as a right-side white lane line). Subsequently, in step S14, the white lane lines detected in step S13 are transformed from an image coordinate system into a three-dimensional real-space coordinate system based on a mounting position of the vehicle-mounted camera 10 and pitching information of the subject vehicle 70. The pitching information of the subject vehicle 70 may be calculated based on detection values from an acceleration sensor (not shown) or the like.

Subsequently, in step S15, various parameters used in the LKA control are calculated using a Kalman filter from the left-side and right-side white lane lines transformed into the three-dimensional real-space coordinate system in step S14. The various parameters include curvatures of the white lane lines, cross-lane direction distances between the white lane lines and the subject vehicle 70, angles of the white lane lines to the vehicle 70, a width of the travel lane, and others. Average calculated parameter values between the left-side white lane line and the right-side white lane line are used in the LKA control.

A vehicle electronic control unit (ECU) (not shown) is configured to, when an LKA switch (not shown) is on, locate a target travel line of the subject vehicle 70 substantially halfway between the left-side and right-side white lane lines using the various parameters calculated in step S15, and in the LKA control, assist steering so that the subject vehicle 70 can travel along the target travel line. However, if the travel lane diverges and widens ahead of the subject vehicle 70, LKA-controlling the subject vehicle 70 along the target travel line located substantially halfway between the left-side and right-side white lane lines may cause unstable control of the subject vehicle. Therefore, if the travel lane widens ahead of the subject vehicle, only one of the left-side white lane line and the right-side white lane line that lies on the driver's intended side is selected to continue stable LKA control. In such a case, the LKA control is conducted using the parameters calculated from the selected one of the left-side white lane line and the right-side white lane line.

In step S16, the abnormality determiner 40 determines, based on the width of the travel lane calculated in step S15, whether or not the width of the travel lane is abnormal ahead of the subject vehicle 70. That is, the abnormality determiner 40 determines whether or not one of the left-side white lane line and the right-side white lane line should be recognized in the one-side line recognition mode 51. If the width of the travel lane is equal to or less than a threshold, it is determined in step S16 that the width of the travel lane is not abnormal. It is determined that both the left-side white lane line and the right-side white lane line should be recognized in the both-side line recognition mode 52. That is, the LKA is conducted using the parameters calculated in step S15.

If in step S16 the abnormality determiner 40 determines that the width of the travel lane calculated in step S15 is greater than the threshold, it is determined in step S16 that the width of the travel lane is abnormal. Also in a case where only one of the left-side white lane line and the right-side white lane line can be detected and thus the width of the travel lane cannot be calculated, the abnormality determiner 40 determines that the width of the travel lane is abnormal. If it is determined that the width of the travel lane is abnormal, it is determined in step S18 that only one of the left-side white lane line and the right-side white lane line should be recognized in the one-side line recognition mode 51. Further, the driver is informed that the recognition mode of the lane-line recognizer 50 was switched to the one-side line recognition mode 51 and that one of the left-side white lane line and the right-side white lane line is recognized in the one-side line recognition mode 51.

If it is determined that the lane-line recognizer 50 is put in the one-side line recognition mode 51, one of the left-side white lane line and the right-side white lane line along which the LKA control is conducted is determined in step S19. That is, one of the left-side white lane line and the right-side white lane line detected in step S13 is selected to be recognized.

More specifically, for each of the left-side and right-side white lane lines, parameters representing a position of the subject vehicle 70 in the travel lane relative to the white lane line and parameters representing a shape of the white lane line are calculated. For example, as shown in FIG. 3A, parameters of the current position of the subject vehicle 70 relative to the left-side and right-side white lane lines include current angles $\theta l1$, $\theta r1$ of the left-side and right-side white lane lines to the subject vehicle 70, and current cross-lane direction distances dl1, dr1 between the left-side and right-side white lane lines and the center line of the subject vehicle 70. The parameters of a position of the subject vehicle 70 after a predetermined time of travel (e.g., 0.5 seconds) for the left-side and right-side white lane lines include angles $\theta l2$, $\theta r2$ of the left-side and right-side white lane lines to an expected direction of travel of the subject vehicle 70 and cross-lane direction distances dl2, dr2 between the left-side and right-side white lane lines and an expected position of the subject vehicle 70. Parameters representing shapes of the left-side and right-side white lane lines include radii Rl, Rr of the left-side and right-side white lane lines and thicknesses Wl, Wr of the left-side and right-side white lane lines.

The expected direction of travel and the expected position of the subject 70 after the predetermined time of travel may be estimated using sensor values of a vehicle-speed sensor 71 configured to detect a vehicle speed of the subject vehicle 70 and a steering angle sensor 72 configured to detect a steering angle of the subject vehicle 70. Instead of using the sensor values of the steering angle sensor 72, sensor values of a yaw rate sensor may be used.

For each of the parameters $\theta l1$, dl1, $\theta l2$, dl2, Rl, Wl of the left-side white lane line, a priority to select the left-side white lane line is calculated based on a calculated value of the parameter. Thereafter, the priorities for the respective parameters $\theta l1$, dl1, $\theta l2$, dl2, Rl, Wl are integrated to calculate an integrated priority to select the left-side white lane line. Similarly, an integrated priority to select the right-side white lane line is calculated.

The priorities of the left-side and right-side white lane lines for the current angles $\theta l1$, $\theta r1$ to the subject vehicle 70 are calculated such that one of the left-side and right-side white lane lines having a smaller angle is selected in preference to the other to achieve the stable LKA control. More specifically, for each of the left-side and right-side white lane lines having the current angles $\theta l1$, $\theta r1$ to the subject vehicle 70, the priority takes a value between −1 and 1. At an angle of zero degrees where the white line is parallel to the subject vehicle, the priority is set to 1. At an angle of 45 degrees, the priority is set to −1. As the angle decreases, the priority increases to approach 1.

Similarly, the priorities of the left-side and right-side white lane lines for the angles $\theta l2$, $\theta r2$ to the expected direction of travel of the subject vehicle 70 after the predetermined time of travel are calculated such that one of the left-side and right-side white lane lines having a smaller angle is selected in preference to the other.

The priorities of the left-side and right-side white lane lines for the current distances dl1, dr1 between the left-side and right-side white lane lines and (the center line of) the subject vehicle 70 are calculated such that one of the left-side and right-side white lane lines having a smaller distance is selected in preference to the other to achieve the stable LKA control. More specifically, for each of the left-side and right-side white lane lines having the current distances dl1, dr1, the priority takes a value between −1 and 1. When the current distances dl1, dr1 between the left-side and right-side white lane lines and (the center line of) the subject vehicle 70 are equal to each other, that is, dl1=dr1 (=dr), the priority is set to zero. As the current distance decrease from the distance dr, the priority increases to approach 1. As the current distance increases from the distance dr, the priority decreases to approach −1.

Similarly, the priorities of the left-side and right-side white lane lines for the distances dl2, dr2 between the left-side and right-side white lane lines and the expected position of the subject vehicle 70 after the predetermined time of travel are calculated such that one of the left-side and right-side white lane lines having a smaller distance is selected in preference to the other.

The priorities of the left-side and right-side white lane lines for the curvature radii Rl, Rr are calculated such that one of the left-side and right-side white lane lines having a larger curvature radius is selected in preference to the other to achieve the stable LKA control. In the presence of a turnoff located ahead of the subject vehicle, the driver of the subject vehicle 70 is susceptible to uncomfortable feeling, such as feeling attracted in a direction a turnoff lane turns, when the LKA control is conducted along a white lane line of the travel lane that turns. Therefore, to prevent the driver from feeling uncomfortable, one of the left-side and right-side white lane lines that is closer in shape to a straight line is selected in preference to the other. More specifically, for each of the left-side and right-side white lane lines having the curvature radii Rl, Rr, the priority takes a value between −1 and 1. When the white lane line is a straight line, the priority is set to 1. As the curvature radius decrease, the priority takes a value closer to −1.

The priorities of the left-side and right-side white lane lines for the thicknesses Wl, Wr are calculated such that one of the left-side and right-side white lane lines having a larger thickness is selected in preference to the other. In the presence of a turnoff located ahead of the subject vehicle, a white lane line or lanes of a turnoff lane is often run over by vehicles to become faint and thin. Therefore, to prevent the driver from feeling uncomfortable, one of the left-side and right-side white lane lines that is closer in shape to a straight line is selected in preference to the other. More specifically, for each of the left-side and right-side white lane lines having the thicknesses Wl, Wr, the priority takes a value between −1 and 1. As the thickness of the white lane line becomes closer to a regular thickness or an average of previously calculated thicknesses, the priority takes a value closer 1.

Also when one of the left-side and right-side white lane lines diverges into two white lane lines, one being a right-side white lane line of a left turnoff lane and the other being a left-side white lane line of a right turnoff lane, at a turnoff located ahead of the subject vehicle 70, the LKA control can be conducted along the left-side and right-side white lane lines even after passing through the turnoff.

Thereafter, a weighted sum of the priorities of the left-side white lane line for the respective parameters are calculated, and a weighted sum of the priorities of the right-side white lane line for the respective parameters are calculated. More specifically, to respect driver's intention, for each of the left-side and right-side white lane lines, the priorities for the parameters representing the position of the subject vehicle 70 in the travel lane relative to the white lane line are weighted more heavily than the priorities for the parameters representing the shape of the white lane line. To further respect driver's intention, the priorities for the angles of the left-side and right-side white lane lines to the subject vehicle 70 at a certain time instant are weighted more heavily than the priorities for the distances between the left-side and right-side white lane lines and the subject vehicle 70 at the same time instant. To stress a positional relationship between the left-side and right-side white lane lines and the subject vehicle 70 in an area where the travel lane widens ahead of the subject vehicle 70, the priorities for the parameters representing positions of the subject vehicle 70 in the travel lane relative to the left-side and right-side white lane lines after a predetermined time of travel are weighted more heavily than the priorities for the parameters representing current positions of the subject vehicle 70 in the travel lane relative to the left-side and right-side white lane lines. More specifically, the priority of the left-side white lane line for the parameter θl2 is weighted heaviest, followed by the priorities for the respective parameters of the left-side white lane line dl2, θl1, dl1, Rl, Wl in this order. The priorities of the right-side white lane line for the respective parameters are weighted in a similar manner. One of the left-side and right-side white lane lines having a higher integrated priority than the other is determined as a white lane line to be recognized.

FIGS. 3A, 3B show an example scenario where the lane-line recognizes 50 selects the right-side white lane line from the left-side and right-side white lane lines detected by the lane-line detector 30 in one-side line recognition mode 51 to recognize the right-side white lane line as a white lane line along which the LKA control is conducted. If in step S13 only a one-side white lane line, that is, either the left-side white lane line or the right-side white lane line, can be detected by the lane-line detector 30, the detected one-side white lane line is recognized as a white lane line along which the LKA control is conducted.

In the present embodiment described above, for each of the left-side and right-side white lane lines, the priorities calculated for the respective parameters are integrated to calculate the integrated priority. That is, in the present embodiment, the integrated priorities are calculated for the respective left-side and right-side white lane lines. Alternatively, for each of the left-side and right-side white lane lines, each of the priorities for the respective parameters may be represented by a likelihood of 0 to 1, and the priorities for the respective parameters are integrated to calculate the integrated likelihood. That is, the integrated likelihoods may be calculated for the respective left-side and right-side white lane lines.

Subsequently, in step S20, various parameters of the white lane line determined in step S19, such as the curvature of the white lane line used in the LKA control, the cross-lane direction distance between the white lane line and the subject vehicle 70, and the angle of the white lane line to the subject vehicle 70, are calculated. Thereafter, the process ends.

The vehicle ECU is configured to, when the LKA switch is on, use the parameters calculated in step S19 to set a target travel line spaced apart from the recognized white lane line by a predetermined distance and conduct the LKA control so that the subject vehicle 70 can travel along the target travel line. The predetermined distance may be set to a half of a mean of previously calculated travel lane widths.

The present embodiment described above can provide the following advantages.

Based on an image captured by the vehicle-mounted camera 10, the left-side and right-side white lane lines are detected. Thereafter, based on the detected left-side and right-side white lane lines, it is determined whether or not the travel lane width is abnormal. If it is determined that the travel lane width is abnormal, then the lane-line recognizer recognizes one of the left-side and right-side white lane lines as a white lane line along which the subject vehicle is controlled, not in the both-side line recognition mode 52, but in the one-side line recognition mode 51.

For each of the detected left-side and right-side white lane lines, two or more parameters of the parameters representing positions of the subject vehicle 70 in the travel lane relative to the white lane line and the parameters representing a shape of the white lane line are calculated. Thereafter, the priorities for the respective two or more parameters are calculated and then integrated. Based on the integrated priorities of the left-side and right-side white lane lines, one of the left-side and right-side white lane lines is selected to be recognized. That is, when a one-side white lane line is to be recognized, one of the left-side and right-side white lane lines is selected based on the priorities for the respective two or more parameters, which can increase the accuracy of selecting the white lane line to be recognized. In addition, even in a situation that the travel lane widens ahead of the subject vehicle, one of the left-side and right-side white lane lines can be accurately selected, which allows driving assistance to be continued based on the one-side white lane line recognized as above.

The driving assistance based on the one-side white lane line recognition can only provide reduced driver's comfort as compared to the driving assistance based on the both-side white lane line recognition. Therefore, informing the driver of switching between the both-side line recognition mode 52 and the one-side line recognition mode 51 allows the driver to know to what extent a comfortable condition is realized and determine whether to continue or suspend the driving assistance.

In a situation where the travel lane widens, the subject vehicle 70 is more likely to travel along one of the left-side and right-side white lane lines that is currently more parallel to the subject vehicle 70. Therefore, making one of the left-side and right-side white lane lines that is at a smaller angle to the subject vehicle 70 than the other more susceptible to be selected can increase the accuracy of selecting the one of the left-side and right-side white lane lines to be recognized.

In a situation where the travel lane widens, the subject vehicle 70 is more likely to travel along one of the left-side and right-side white lane lines that is currently closer to the subject vehicle 70. Therefore, making one of the left-side and right-side white lane lines that is closer to the subject vehicle 70 than the other more susceptible to be selected can increase the accuracy of selecting the one of the left-side and right-side white lane lines to be recognized.

In a situation where the travel lane widens, the subject vehicle 70 is more likely to travel along one of the left-side and right-side white lane lines that is more parallel to the expected direction of travel of the subject vehicle 70 after the predetermined time of travel. Therefore, making one of the left-side and right-side white lane lines that is at a smaller angle to the expected direction of travel of the subject vehicle 70 after the predetermined time of travel than the other more susceptible to be selected can increase the accuracy of selecting the one of the left-side and right-side white lane lines to be recognized.

In a situation where the travel lane widens, the subject vehicle 70 is more likely to travel along one of the left-side and right-side white lane lines that is closer to the subject vehicle 70 after the predetermined time of travel. Therefore, making one of the left-side and right-side white lane lines that is closer to the expected position of travel of the subject vehicle 70 after the predetermined time of travel than the other more susceptible to be selected can increase the accuracy of selecting the one of the left-side and right-side white lane lines to be recognized.

In the presence of a turnoff where the travel lane diverges, the driver of the subject vehicle 70 is susceptible to uncomfortable feeling, such as feeling attracted in a direction a turnoff lane turns, when the driving assistance is conducted along a white lane line of the turnoff lane that turns. Therefore, making one of the left-side and right-side white lane lines that is closer in shape to a straight line more susceptible to be selected can prevent the driver from feeling uncomfortable when the driving assistance is conducted.

In the presence of a turnoff where the travel lane diverges, one of the left-side and right-side white lane lines that turns is often run over by vehicles to become faint and thin. Therefore, making one of the left-side and right-side white lane lines that is thicker than the other more susceptible to be selected allows one of the left-side and right-side white lane lines that is closer to the straight line to be selected in preference to the other and can prevent the driver from feeling uncomfortable when the driving assistance is conducted.

The parameters representing positions of the subject vehicle 70 in the travel lane relative to the white lane lines $\theta l1$, $\theta r1$, $\theta l2$, $\theta r2$, $dl1$, $dr1$, $dl2$, $dr2$ reflect the driver's intention better than the parameters representing shapes of the white lane lines Rl, Rr, Wl, Wr. In addition, the angle parameters $\theta l1$, $\theta r1$, $\theta l2$, $\theta r2$ reflect the driver's intention better than the distance parameters $dl1$, $dr1$, $dl2$, $dr2$. Therefore, the parameters better reflecting the driver's intention are more heavily weighted and then the priorities for the respective two or more of the parameters are integrated. This allows one of the left-side and right-side white lane lines reflecting the driver's intention better to be selected.

Other Embodiments

In some alternative embodiments, the parameters $\theta l1$, $\theta r1$, $\theta l2$, $\theta r2$, $dl1$, $dr1$, $dl2$, $dr2$ representing positions of the subject vehicle 70 may only be weighted more heavily than the parameters Rl, Wl representing shapes of the white lane lines. Further, the parameters $\theta l1$, $\theta r1$, $\theta l2$, $\theta r2$ may be weighted more heavily than the parameters $dl1$, $dr1$, $dl2$, $dr2$.

In some alternative embodiments, the priorities for at least two of the parameters $\theta l1$, $dl1$, $\theta l2$, $dl2$, Rl, Wl of the left-side white lane line may be calculated and then integrated. The priorities for at least two of the parameters of the right-side white lane line may also be calculated and then integrated.

What is claimed is:

1. A lane line recognition apparatus comprising:
    an imaging unit mounted in a vehicle and configured to capture an image of a travel lane;
    a lane-line detector configured to detect left-side and right-side lane lines that define the travel lane based on the image captured by the vehicle-mounted camera;
    an abnormality determiner configured to determine whether or not a width of the travel lane defined by the left-side and right-side lane lines detected by the lane-line detector is abnormal;
    a lane-line recognizer configured to, when it is determined by the abnormality determiner that the width of the travel lane is not abnormal, recognize both of the left-side and right-side lane lines in a both-side line recognition mode, and when it is determined by the abnormality determiner that the width of the travel lane is abnormal, recognize one of the left-side and right-side lane lines in a one-side line recognition mode,
    wherein in the one-side line recognition mode, the lane-line recognizer is configured to, for each of the left-side and right-side lane lines detected by the lane-line detector, calculate two or more parameters, of parameters representing positions of the vehicle in the travel lane relative to the lane line and parameters representing a shape of the lane line, then integrate recognition results for the respective two or more parameters are integrated, and based on the integrated recognition results of the left-side and right-side lane lines, select one of the left-side and right-side lane lines to be recognized;
    wherein the lane-line detector, the abnormality determiner, and the lane-line recognizer are all being performed by one or more processors.

2. The apparatus of claim 1, further comprising an annunciator configured to inform a driver of the vehicle of a recognition mode of the lane-line recognizer switching between the both-side line recognition mode and the one-side recognition mode.

3. The apparatus of claim 1, wherein
    the two or more parameters for each of the left-side and right-side lane lines detected by the lane-line detector include a current angle of the lane line to the vehicle, and
    the lane-line recognizer is configured to, in the one-side line recognition mode, select one of the left-side and right-side lane lines that is at a smaller angle to the vehicle in preference to the other.

4. The apparatus of claim 1, wherein
    the two or more parameters for each of the left-side and right-side lane lines detected by the lane-line detector include a current cross-lane direction distance between the lane line and the vehicle, and
    the lane-line recognizer is configured to, in the one-side line recognition mode, select one of the left-side and right-side lane lines that is currently closer to the vehicle in preference to the other.

5. The apparatus of claim 1, wherein
    the two or more parameters for each of the left-side and right-side lane lines detected by the lane-line detector include an angle of the lane line to an expected direction of travel of the vehicle after a predetermined time of travel, and
    the lane-line recognizer is configured to, in the one-side line recognition mode, select one of the left-side and right-side lane lines that is at a smaller angle to the expected direction of travel of the vehicle in preference to the other.

6. The apparatus of claim 1, wherein
    the two or more parameters for each of the left-side and right-side lane lines detected by the lane-line detector include a cross-lane direction distance between an expected position of the vehicle after a predetermined time of travel and the lane line, and the lane-line recognizer is configured to, in the one-side line recognition mode, estimate the cross-lane direction distance between the expected position of the vehicle after the predetermined time of travel and each of the left-side and right-side lane lines detected by the lane-line detector, and select one of the left-side and right-side lane lines that is closer to the expected position of the vehicle after the predetermined time of travel in preference to the other.

7. The apparatus of claim 1, wherein
the two or more parameters for each of the left-side and right-side lane lines detected by the lane-line detector include a curvature radius of the lane line, and
the lane-line recognizer is configured to, in the one-side line recognition mode, select one of the left-side and right-side lane lines having a larger curvature radius in preference to the other.

8. The apparatus of claim 1, wherein
the two or more parameters for each of the left-side and right-side lane lines detected by the lane-line detector include a thickness of the lane line, and
the lane-line recognizer is configured to, in the one-side line recognition mode, select one of the left-side and right-side lane lines having a larger thickness in preference to the other.

9. The apparatus of claim 1, wherein
for each of the left-side and right-side lane lines detected by the lane-line detector,
recognition results of the lane line for the parameters representing a position of the vehicle in the travel lane relative to the lane line are weighted more heavily than recognition results of the lane line for the parameters representing a shape of the lane line,
a recognition result of the lane line for an angle of the lane line to the vehicle at a time point is weighted more heavily than a recognition result of the lane line for a cross-lane direction distance between the lane line and the vehicle at the same time point, and
the recognition results of the lane line for the respective two or more parameters are integrated.

* * * * *